3,203,808
FOOD PRODUCTS

Joseph John Thompson and Charles Albert Doan, Battle Creek, Mich., assignors to Kellogg Company, Battle Creek, Mich., a corporation of Delaware
No Drawing. Filed Aug. 23, 1962, Ser. No. 218,819
5 Claims. (Cl. 99—204)

This invention relates to the production of quick cooking, sometimes termed "instant" food products.

More particularly, the present invention relates to the method of preparing quick cooling, dried, storage-stable, whole, discrete legumes, from similar hard, raw, dried, whole, discrete legumes of commerce.

A particular object of the present invention is to provide instant or quick cooking beans and peas of the class aforesaid, which are treated in a manner whereby they may be rapidly prepared for eating.

It is a further object of the present invention to prepare quick cooking, storage-stable, dry beans and peas which substantially retain their natural and individual shapes even though they have been pre-treated in accordance with the present invention to enable them to be rapidly prepared for eating.

In general, the method of the present invention comprises preparing quick cooking, dried, whole beans or peas, by subjecting dried, raw, whole beans or peas to contact with moisture to at least soften their surfaces and adjacent interior, followed by perforating or puncture the skin or seed coat and the body or cotyledon at a number of points and from opposed surface areas. The thus perforated legumes are then subjected to cooking to a desired extent while still substantially retaining their integrity. Thereafter, the pre-cooked particles are subjected to heat drying to reduce their moisture content to substantially equal to that of or below that of the original dried particle employed. For example, the dried peas and beans of commerce, to be storage stable, have a moisture content of from about 10 to about 12% by weight, and we convenient re-dry to at least this moisture content, or preferably to about 5 to about 8% of moisture by weight.

This perforating procedure permits the dried beans and peas to be cooked and then dried to a low moisture content without causing them to lose their individuality. The perforations also allow the moisture to escape readily from the particle during the re-drying operation.

Softening of the dried article preciding the perforating step may be carried out by steeping in water overnight or in a more rapid manner by, for example, placing in boiling water and cooking for several minutes, and then draining. As an aid in moistening and surface softening chemical adjuvants can be employed such as a mild alkaline solution, for example, a 1% sodium bicarbonate solution.

The raw, dried whole legumes may be perforated either batchwise or continuously after the aforesaid softening treatment. Thus, in the batch treatment they can be impaled on steel pins mounted on a block on 0.1 inch centers. For example, a 3" x 3" grid of 10 x 10 to the inch was laid out on a ⅜" thick steel block and then 0.035" diameter holes were drilled through the plate at the intersections of the grid lines 1-inch steel pins were then inserted into these holes and a back-up plate was then attached to the block to hold the pins in place. One or an opposed pair of such blocks may be employed for perforating the skins and adjacent interior of soaked beans or peas so as to provide, for example, 5 to 10 small holes, more or less, on each side of each bean, depending on its size.

In the alternative, the particles may be perforated by being pressed onto a fine wire brush. In continuous perforating processes, the particles may be fed between pairs of brushes or between pairs of rollers having radially extending pins.

The raw dried beans and peas of commerce which can be prepared in accordance with the present invention are designated by various names some of which indicate species or varieties; some sizes and colors; and others localities and countries of growth or origin. Thus, some of these, for the purpose of illustration and not limitation, are as follows: navy or pea beans, pinto beans, chick peas, cowpea or black-eyed pea, Indian bean, broad bean or Windsor or horse bean, French or haricot bean, red kidney or scarlet runner bean, lima bean, field pea or English Garden pea, terpay bean, frijole or small flat black Maxican kidney bean, soya bean, chili bean, Michigan pea beans, blackeyed or China beans, red beans, Great Northern beans, red Mexican beans, white kidney beans, black or turtle beans, U.S. #1 pink beans, marrowfat beans, Japanese beans, cranberry beans, yelloweye beans, adsuki beans, canario brown beans, Vera Cruz black beans, Swedish brown beans, and others.

In one specific example, for the purposes of illustration and not limitation, a batch of raw, dried navy beans of commerce were soaked overnight in a 1% sodium bicarbonate solution, 4 parts of solution being employed to 1 part of beans. The soaked beans were then removed from the solution and pierced all the way through using steel pins that were mounted on a block as aforesaid. After being pierced the beans were removed from the pins and placed on a stainless steel tray and cooked in an autoclave for 1 hours and 30 minutes at 5 pounds per square inch gauge steam pressure. The cooked beans were then dried for 2 hours at a temperature of 170–175° F. in a forced hot air drier to a moisture content of approximately 7%. These beans were then storage stable and could be cooked rapidly for eating in a much shorter time than is conventional for dried beans which were not treated in accordance with the present process.

In another specific example, for the purpose of illustration and not limitation, a quick cooking bean product was made using two varieties of Mexican beans that had been shipped in from Mexico. One variety was a black bean very similar in size and shape to the navy bean that is grown in Michigan, U.S.A. The other variety was a tan bean similar in size and shape to a white kidney bean. The beans were processessed as follows:

(1) The beans were soaked overnight at 65–70° F.— 2 pounds beans in 5 pounds of water containing 46 grams sodium bicarbonate to a moisture content of 50–55%.

(2) The soaked beans were drained. The black beans were screened over a No. 3 U.S.S. sieve to remove small hard beans that had not soaked up any water. The tan beans did not require any screening because they all soaked up very well.

(3) The beans were perforated by passing them through a pair of rolls 2 inches in diameter by ⅝ inch wide. Each roll was made up of 10 brass 32 pitch gears that had been chamfered on each side which made the teeth sharp points.

(4) The beans were soaked in excess tap water for ½ hour after perforating to replenish the moisture lost during the perforating operation.

(5) The soaked beans were drained and placed on a perforated tray and then placed in the autoclave to cook at 5 pounds per square inch, gauge, for 1½ hours.

(6) The cooked beans were dried in an oven with forced air at 170° F. for 1½ hours to a moisture content of 7%.

(7) The dried beans were cooled and packaged.

The products prepared in accordance with the present invention can be rapidly reconstituted, that is, take up hot water in about five minutes, to thereby provide a cooked, and highly palatable bean or pea. One can even place the re-dried product in boiling water, and upon standing for a few minutes it is ready to be eaten. The reconstituted product can be further processed in conventional manner, as for example by making a patty in vegetable oil and frying, i.e., Mexican fried beans.

We claim:

1. The method of preparing quick cooking, edible, hard, dry, whole, discrete legumes having moisture content of from about 10 to about 12 percent by weight, which comprises immersing raw legumes in said hard, dry, whole condition in water to soften their surfaces, perforating them at a plurality of points, then cooking them in the presence of added moisture, and then drying the cooked legumes with hot air to substantially the original dry moisture content.

2. The method of preparing quick cooking, edible, hard, dry, whole, discrete legumes of the class of beans and peas having moisture content of from about 10 to about 12 percent by weight, which comprises immersing them in raw, hard, dry, whole condition in a weak aqueous alkaline solution to soften their surfaces, perforating them at a plurality of points, cooking said perforated particles in the presence of added moisture, and then drying the cooked particles with hot air to substantially the original moisture content of said dry particles subjected to treatment.

3. The method of preparing quick cooking hard, dry, whole beans having moisture content of from about 10 to about 12 percent by weight which comprises immersing raw, hard, dry, whole beans in water to soften their surfaces, perforating said surfaces at a plurality of points, cooking said perforated beans, and then drying them with hot air to substantially the moisture content of the dry beans treated.

4. The method of preparing quick cooking hard, dry, whole peas having moisture content of from about 10 to about 12 percent by weight which comprises immersing raw, hard, dry whole peas in water to soften their surfaces, perforating said surfaces at a plurality of points, cooking said perforated peas, and then drying them with hot air to substantially the moisture content of the dry peas treated.

5. The method of preparing quick cooking, hard, dry, whole beans which comprises steeping raw, hard, dry, whole beans having moisture content of from about 10 to about 12 percent by weight in a weak aqueous alkaline solution to soften their surfaces, perforating said surfaces at a plurality of points, cooking said perforated beans, and then drying them with hot air to substantially the moisture content of the dry beans treated.

References Cited by the Examiner

UNITED STATES PATENTS 2,509,719   5/50   Birdseye _____ 99—204

FOREIGN PATENTS 204,434   11/56   Australia.
219,595   1/59   Australia.

A. LOUIS MONACELL, *Primary Examiner.*

HYMAN LORD, *Examiner.*